US009834867B2

(12) United States Patent
Zaltieri et al.

(10) Patent No.: US 9,834,867 B2
(45) Date of Patent: Dec. 5, 2017

(54) POLYAMIDE APPAREL TEXTILE YARNS AND FABRICS AND GARMENTS MADE THEREFROM

(71) Applicant: GOLDEN LADY COMPANY S.P.A., Castiglione delle Stiviere (IT)

(72) Inventors: Mauro Zaltieri, Casteluovo di Asola (IT); Charles Richard Langrick, Middlesbrough (GB)

(73) Assignee: GOLDEN LADY COMPANY S.P.A., Castiglione delle Stiviere (MN) (IT)

( * ) Notice: Subject to any disclaimer, the term of this patent is extended or adjusted under 35 U.S.C. 154(b) by 326 days.

(21) Appl. No.: 14/434,566

(22) PCT Filed: Mar. 14, 2013

(86) PCT No.: PCT/IB2013/052037
§ 371 (c)(1),
(2) Date: Apr. 9, 2015

(87) PCT Pub. No.: WO2014/057364
PCT Pub. Date: Apr. 17, 2014

(65) Prior Publication Data
US 2015/0275403 A1 Oct. 1, 2015

Related U.S. Application Data

(60) Provisional application No. 61/712,106, filed on Oct. 10, 2012.

(51) Int. Cl.
| *D01F 6/90* | (2006.01) |
| *B29D 99/00* | (2010.01) |
| *C08G 69/26* | (2006.01) |
| *C08G 69/36* | (2006.01) |
| *C08G 69/40* | (2006.01) |
| *C08L 77/06* | (2006.01) |
| *C08K 3/22* | (2006.01) |
| *D06M 15/59* | (2006.01) |
| *B29C 47/00* | (2006.01) |
| *B29C 47/78* | (2006.01) |
| *B29C 47/88* | (2006.01) |
| *D04B 21/20* | (2006.01) |
| *D06M 101/34* | (2006.01) |
| *B29K 77/00* | (2006.01) |

(52) U.S. Cl.
CPC ............ *D01F 6/90* (2013.01); *B29C 47/0004* (2013.01); *B29C 47/0014* (2013.01); *B29C 47/78* (2013.01); *B29C 47/786* (2013.01); *B29C 47/8805* (2013.01); *B29C 47/8815* (2013.01); *B29C 47/8895* (2013.01); *B29D 99/0078* (2013.01); *C08G 69/265* (2013.01); *C08G 69/36* (2013.01); *C08G 69/40* (2013.01); *C08K 3/22* (2013.01); *C08L 77/06* (2013.01); *D04B 21/207* (2013.01); *D06M 15/59* (2013.01); *B29K 2077/00* (2013.01); *B29K 2913/00* (2013.01); *B29K 2995/0092* (2013.01); *C08K 2003/2241* (2013.01); *D06M 2101/34* (2013.01); *D10B 2331/02* (2013.01); *D10B 2503/00* (2013.01); *Y10T 428/249921* (2015.04); *Y10T 428/2913* (2015.01); *Y10T 428/2929* (2015.01); *Y10T 442/45* (2015.04); *Y10T 442/463* (2015.04); *Y10T 442/60* (2015.04)

(58) Field of Classification Search
CPC ........................................................ D01F 6/90
USPC ........................................................ 525/480
See application file for complete search history.

(56) References Cited

U.S. PATENT DOCUMENTS

| 3,454,534 | A | 7/1969 | Crovatt |
| 5,053,484 | A | 10/1991 | Speranza et al. |
| 5,164,261 | A | 11/1992 | Windley |
| 5,179,175 | A | 1/1993 | Speranza et al. |
| 5,744,570 | A | 4/1998 | Gebben |
| 5,810,890 | A | 9/1998 | Russ et al. |
| 6,855,425 | B2 | 2/2005 | Lancaster |
| 6,864,348 | B2 | 3/2005 | Okushita et al. |
| 6,869,453 | B1 | 3/2005 | Lewis et al. |
| 2008/0090945 | A1 | 4/2008 | Langrick et al. |
| 2009/0274913 | A1 | 11/2009 | Okushita et al. |
| 2012/0065362 | A1 | 3/2012 | Amey |
| 2015/0275403 | A1* | 10/2015 | Zaltieri ............... C08G 69/265 442/314 |

FOREIGN PATENT DOCUMENTS

| CN | 101472975 A | 7/2009 |
| EP | 0484952 A1 | 5/1992 |
| EP | 1 314 750 A1 | 5/2003 |
| JP | 61-258019 A | 11/1986 |
| JP | 62-50495 B2 | 10/1987 |
| JP | 2004-161964 A | 6/2004 |
| JP | 2009-524747 A | 7/2009 |
| KR | 950 004 493 B1 | 5/1995 |
| KR | 95-6724 B1 | 6/1995 |
| WO | 03/044263 A2 | 5/2003 |

(Continued)

OTHER PUBLICATIONS

Huntsman, Technical Bulletin, Elastamine® Amines for Modification of Thermoplastic Polymers.

(Continued)

*Primary Examiner* — Terressa Boykin
(74) *Attorney, Agent, or Firm* — McGlew and Tuttle, P.C.

(57) ABSTRACT

An apparel textile yarn includes a polyamide. The polyamide includes a nylon and a polyetheramine. The polyetheramine has a molecular weight of at least 1500 and an Amine Hydrogen Equivalent Weight (AHEW) of less than 10 percent higher than the idealized AHEW for the polyetheramine. The polyamide may have a moisture regain ranging from about 10% to about 30%.

44 Claims, 8 Drawing Sheets

(56) References Cited

FOREIGN PATENT DOCUMENTS

WO      2007/085337 A1     8/2007
WO      2011/134883 A1    11/2011

OTHER PUBLICATIONS

Rwei et al., Synthesis and Characterization of Polyethylene Oxide and Nylon-6 Copolymer in a Fiber Form, Journal of Applied Polymer Science, Mar. 31, 2012, E206-E217, vol. 126, Wiley Periodicals, Inc.
The Jeffamine® Polyetheramines, Huntsman, Dec. 31, 2007, pp. 9-14.

* cited by examiner

POLYAMIDE APPAREL TEXTILE YARNS AND FABRICS AND GARMENTS MADE THEREFROM

BACKGROUND OF THE INVENTION

Over the years there have been a number of approaches to incorporate polyether segments in to polyamides with the objective of improving the properties of yarns made from such polyamides. The desirable property of hydrophilicity in nylon yarns for use in apparel applications is often imparted through incorporation of oxyethylene ($-OCH_2CH_2-$) repeat units. Substantial study has been undertaken to find the right balance of oxyethylene repeat units in the polyamide polymer backbone. As a result, such a modified polymer may require altered polymerization conditions and the yarn spinning conditions are not readily predictable or readily adapted to conventional spinning assets.

In the 1980's, Allied introduced a hydrophilic nylon based upon 15 wt % Jeffamine® ED-2001 in Nylon 6 (polycaproamide) under the trade name Hydrofil® nylon. The polymer was made by heating caprolactam with 5% aminocaproic acid (to induce polymerization) and the Jeffamine® ED-2001 at 255° C. After extrusion of the polymer into pellets, the polymer composition is water extracted 5 times at 100° C. to remove residual caprolactam and then dried for 16 hrs. Such extraction and drying are typical disadvantages for any Nylon 6 based polymer over a Nylon 6,6 based polymer.

In a known approach, using the PEBAX® range of thermoplastic elastomers from Arkema Inc, (King of Prussia, Pa., USA), polyetherglycols (polyethers with hydroxyl end groups) are reacted with diacids (e.g., adipic acid) and nylon polymer monomers (e.g., nylon 66 "salt," caprolactam, aminoacids). The resulting nylon polymer is a polyetheresteramide. These are block copolymers of the polyether and the polyamide linked together with an ester group. Such polymers are made using high vacuum (<10 torr) polycondensation processes. The ester linkages formed in such polymers are known to be susceptible to hydrolysis, and therefore, vacuum drying to very low moisture content is required.

Additionally, a treated textile article formed from a synthetic fiber substrate including a polyamide treatment agent for improved moisture transport is described in WO2003/044263. The polyamide treatment agent includes a hydrophobic component and a hydrophilic component. In an embodiment described therein, the hydrophobic component is between about 19% and 95% (mole percent) of the polyamide treatment agent. In addition, the polyamide treatment agent may include effective amounts of any one of an oxyalkylene derivative, an ether linkage, and an oxyalkylene derivative and an ether linkage.

In another approach, the polyether used has amine end groups at each end of the polyether chain. When this polyetherdiamine is reacted with a diacid (e.g., adipic acid) and a nylon monomer (nylon 66 salt or caprolactam) the resulting polymers are polyetheramides. Again, they are block copolymers of polyether and polyamide but now linked with an amide bond. As there are no ester groups present, the polymerization may be less troublesome and does not normally employ high vacuum. However, incorporation of the polyether can be challenging, including inconsistent polymer compositions, poor processing properties, etc. For example, such polyetheramides may not provide spinnable compositions for subsequent processing into yarn.

As such, synthetic polyamide compositions continue to be researched and developed.

SUMMARY OF THE INVENTION

The present invention relates to an apparel textile yarn comprising a polyamide which includes polyether segments and a nylon, particularly wherein the polyamide comprises a nylon and a polyetherdiamine, the polyetherdiamine having a molecular weight of at least 1500 and an Amine Hydrogen Equivalent Weight (AHEW) of less than 10 percent higher than the idealized AHEW for the polyetheramine, and wherein the polyamide preferably has a moisture regain ranging from about 10% to about 30%.

The present invention further relates to a process for producing said apparel textile yarn from said polyamide, said process comprising extruding said molten polyamide through a spinneret plate containing capillary orifices; and forming a yarn from filaments emerging from the spinneret plate.

The apparel textile yarn of the present invention is a textile yarn which is suitable for and limited to making apparel textiles or apparel fabrics, or apparel goods or apparel garments manufactured therefrom.

The yarn can be formed as a mono or multiple continuous filament yarn, comprising one or more continuous spun filaments, at least some of which are partly or entirely formed by the above mentioned polyamide. According to preferred embodiments, all the filaments forming the yarn are partly or entirely made of the above mentioned polyamide comprised of nylon and polyetherdiamine.

In some embodiments, the yarn can be produced from staple fibers through a spinning process.

In some embodiments the filaments or fibers forming the yarn are mono-components, i.e. entirely formed by the polyamide. In other embodiments the filaments or fibers are multi-component filaments or fibers, e.g. bi-component filaments or fibers, comprising a portion made of said polyamide and at least a second portion made of a different polymer. The bi-component fibers or filaments can have a core-skin structure, including a skin made of said polyamide partly or entirely surrounding a core made of a different material. According to further embodiments, the bi-component fibers or filaments can have a side-by-side structure, wherein a first longitudinal portion made of said polyamide extends parallel to a second longitudinal portion made of a different material.

The second component forming a bi-component fiber can be selected from the group comprising: polypropylene; polyethylene terephthalate; polybutylene terephthalate; thermoplastic polyurethane, or combinations thereof.

According to some embodiments the bi-component fibers and filaments can include a first portion made of the above mentioned polyamide and a second portion made of nylon, e.g. nylon 6 or nylon 6,6.

The present invention further relates to apparel textiles, or apparel fabrics, or apparel nonwovens and apparel goods, or apparel garments manufactured therefrom.

Figure 1:
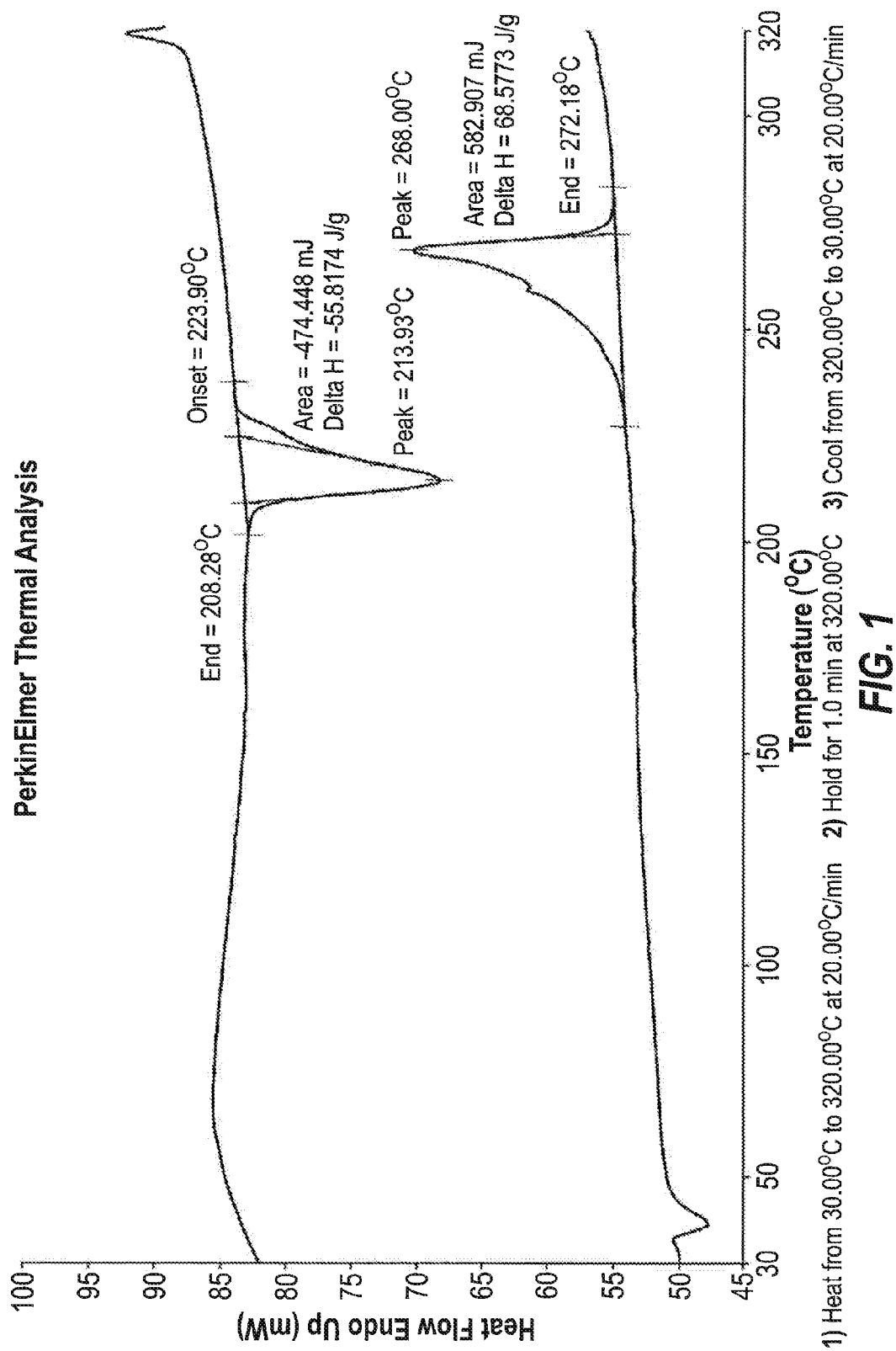
FIG. 1 is a differential scanning calorimetry (DSC) plot of a polyamide used in the present invention.

It should be noted that the figures are merely exemplary of the polyamide from which the apparel textile yarn of the present invention is made.

DETAILED DESCRIPTION OF THE INVENTION

The following detailed description describes in detail polyamides suitable for use in the present invention.

Although the following detailed description contains many specifics for the purpose of illustration, a person of ordinary skill in the art will appreciate that many variations and alterations to the following details are within the scope of the herein disclosed embodiments.

Accordingly, the following embodiments are set forth without any loss of generality to, and without imposing limitations upon any claimed invention. Before the present disclosure is described in greater detail, it is to be understood that this disclosure is not limited to particular embodiments described, as this may vary. It is also to be understood that the terminology used herein is for the purpose of describing particular embodiments only, and is not intended to be limiting, since the scope of the present disclosure will be limited only by the appended claims. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a polyamide" includes a plurality of polyamides.

In this disclosure, "comprises," "comprising," "containing" and "having" and the like can have the meaning ascribed to them in U.S. Patent law and can mean "includes," "including," and the like, and are generally interpreted to be open ended terms. The term "consisting of" is a closed term, and includes only the components, structures, steps, or the like specifically listed, and that which is in accordance with U.S. Patent law. "Consisting essentially of" or "consists essentially" or the like, when applied to methods and compositions encompassed by the present disclosure refers to compositions like those disclosed herein, but which may contain additional structural groups, composition components or method steps. Such additional structural groups, composition components or method steps, etc., however, do not materially affect the basic and novel characteristic(s) of the compositions or methods, compared to those of the corresponding compositions or methods disclosed herein. In further detail, "consisting essentially of" or "consists essentially" or the like, when applied to methods and compositions encompassed by the present disclosure have the meaning ascribed in U.S. Patent law and the term is open-ended, allowing for the presence of more than that which is recited (e.g., trace contaminants, components not reactive with the polymer or components reacted to form the polymer, and the like) so long as basic or novel characteristics of that which is recited is not changed by the presence of more than that which is recited, but excludes prior art embodiments. When using an open ended term, like "comprising" or "including," it is understood that direct support should be afforded also to "consisting essentially of" language as well as "consisting of" language as if stated explicitly.

The term Amine Hydrogen Equivalent Weight (AHEW) is defined as the molecular weight of the polyetheramine divided by the number of active amine hydrogen per molecule. For illustration, an idealized polyetherdiamine having an average molecular weight of 2000 and where all the ends of the polyether were amine ends, hence contributing 4.0 active amine hydrogens per molecule, would have an AHEW of 500 g per equivalent. If, for comparison, 10 percent of the ends were in fact hydroxyl rather than amine, then there would be only 3.6 active amine hydrogens per molecule and the polyetheramine would have an AHEW of 556 g per equivalent. The number of active amine hydrogens per molecule, and therefore the AHEW, of a given polyetheramine can be calculated according to known and conventional techniques in the art, however it is preferably calculated by determining the amine group nitrogen content using the procedure described in ISO 9702. The term "aliphatic group" refers to a saturated or unsaturated linear or branched hydrocarbon group and encompasses alkyl, alkenyl, and alkynyl groups, for example.

The terms "alk" or "alkyl" refer to straight or branched chain hydrocarbon groups having 1 to 12 carbon atoms, for example 1 to 8 carbon atoms, such as methyl, ethyl, n-propyl, i-propyl, n-butyl, i-butyl, t-butyl, pentyl, hexyl, heptyl, n-octyl, dodecyl, octadecyl, amyl, 2-ethylhexyl, and the like. An alkyl group is optionally substituted, unless stated otherwise, with one or more groups, selected from aryl (optionally substituted), heterocyclo (optionally substituted), carbocyclo (optionally substituted), halo, hydroxy, protected hydroxy, alkoxy (e.g., C1 to C7) (optionally substituted), acyl (e.g., C1 to C7), aryloxy (e.g., C1 to C7) (optionally subsituted), alkylester (optionally substituted), arylester (optionally substituted), alkanoyl (optionally substituted), aroyl (optionally substituted), carboxy, protected carboxy, cyano, nitro, amino, substituted amino, (monosubstituted)amino, (disubstituted)amino, protected amino, amido, lactam, urea, urethane, sulfonyl, and the like.

The term "alkenyl" refers to straight or branched chain hydrocarbon groups having 2 to 12 carbon atoms, for example 2 to 4 carbon atoms, and at least one double carbon to carbon bond (either cis or trans), such as ethenyl. An alkenyl group is optionally substituted, unless stated otherwise, with one or more groups, selected from aryl (including substituted aryl), heterocyclo (including substituted heterocyclo), carbocyclo (including substituted carbocyclo), halo, hydroxy, alkoxy (optionally substituted), aryloxy (optionally substituted), alkylester (optionally substituted), arylester (optionally substituted), alkanoyl (optionally substituted), aroyl (optionally substituted), cyano, nitro, amino, substituted amino, amido, lactam, urea, urethane, sulfonyl, and the like.

The term "alkynyl" refers to straight or branched chain hydrocarbon groups having 2 to 12 carbon atoms, for example 2 to 4 carbon atoms, and at least one triple carbon to carbon bond, such as ethynyl. An alkynyl group is optionally substituted, unless stated otherwise, with one or more groups, selected from aryl (including substituted aryl), heterocyclo (including substituted heterocyclo), carbocyclo (including substituted carbocyclo), halo, hydroxy, alkoxy (optionally substituted), aryloxy (optionally substituted), alkylester (optionally substituted), arylester (optionally substituted), alkanoyl (optionally substituted), aroyl (optionally substituted), cyano, nitro, amino, substituted amino, amido, lactam, urea, urethane, sulfonyl, and the like.

Phrases such as "suitable to provide," "sufficient to cause," or "sufficient to yield," or the like, in the context of methods of synthesis, refers to reaction conditions related to time, temperature, solvent, reactant concentrations, and the like, that are within ordinary skill for an experimenter to vary to provide a useful quantity or yield of a reaction product. It is not necessary that the desired reaction product be the only reaction product or that the starting materials be entirely consumed, provided the desired reaction product can be isolated or otherwise further used.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range includes "about 'x' to about 'y'". To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

The term "about" as used herein, when referring to a numerical value or range, allows for a degree of variability in the value or range, for example, within 10%, or, in one aspect within 5%, of a stated value or of a stated limit of a range.

In addition, where features or aspects of the disclosure are described in terms of a list or a Markush group, those skilled in the art will recognize that the disclosure is also thereby described in terms of any individual member or subgroup of members of the Markush group. For example, if X is described as selected from the group consisting of bromine, chlorine, and iodine, claims for X being bromine and claims for X being bromine and chlorine are fully described as if listed individually. For example, where features or aspects of the disclosure are described in terms of such lists, those skilled in the art will recognize that the disclosure is also thereby described in terms of any combination of individual members or subgroups of members of list or Markush group. Thus, if X is described as selected from the group consisting of bromine, chlorine, and iodine, and Y is described as selected from the group consisting of methyl, ethyl, and propyl, claims for X being bromine and Y being methyl are fully described and supported.

As used herein, all percent compositions are given as weight-percentages, unless otherwise stated. When solutions of components are referred to, percentages refer to weight-percentages of the composition including solvent (e.g., water) unless otherwise indicated.

As used herein, all molecular weights (Mw) of polymers are weight-average molecular weights, unless otherwise specified.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features that may be readily separated from or combined with the features of any of the other several embodiments without departing from the scope or spirit of the present disclosure. Any recited method can be carried out in the order of events recited or in any other order that is logically possible.

Embodiments of the present disclosure employ, unless otherwise indicated, techniques of chemistry, and the like, which are within the skill of the art. Such techniques are explained fully in the literature.

Polyamides suitable for use in the present invention include polyether segments and a nylon, wherein the polyamide comprises a nylon and a polyetherdiamine, the polyetherdiamine having a molecular weight of at least 1500, and an Amine Hydrogen Equivalent Weight (AHEW) of less than 10 percent higher than the idealized AHEW for the polyetherdiamine, and wherein the polyamide preferably has a moisture regain ranging from about 10% to about 30%.

The polyamides disclosed herein are well-suited for making hydrophilic polyamide compositions which are particularly useful when spun into apparel textile yarns. The present invention relates to apparel textile yarns spun from such improved synthetic polyamide (nylon) polymer compositions. Generally, such polyamides comprise nylon and a polyetheramine and can have a moisture regain (measured as described herein) ranging from about 10% to about 30%, preferably from about 10 to about 25%, preferably from about 15 to about 25%. Such regain can allow for improved processability during subsequent processing of the polyamide compositions. For example, the polyamide can have an elongation to break of from 20% to 90% when spun into a yarn. The polyamide composition may be either an acid (anionic) or base (cationic) dyeable polymer, as discussed herein. In one embodiment, at least 85 per cent of the polymer backbone (between amide units) can comprise aliphatic groups. The nylon discussed herein can be polyhexamethylene adipamide (nylon 6,6), polycaproamide (nylon 6), or copolymers of either of these. In one embodiment, the nylon can be nylon 6,6. Generally, the nylon can be present in the polyamide in an amount ranging from about 50% to 95% by weight.

The polyetheramine can be made by reacting polyethyleneglycol of molecular weight of about 2000 with three to four molecules of propyleneoxide to convert the primary terminal hydroxyl groups to secondary hydroxyl ends. The secondary hydroxyl ends are subsequently converted into amine groups. Incomplete conversion results in a polyetheramine product containing residual hydroxyl end groups, such hydroxyl groups are incapable of forming amide groups during a polyamide polymerization process, limiting the rate and degree of polymerization, and are hence undesirable. Such incomplete conversion is reflected in the AHEW value of the polyetheramine being higher than the idealised value. The Technical Data Sheet for Elastamine® RE-2000 describes the polyetheramine as being a polyetherdiamine of approximate molecular weight 2000, hence it has an idealised AHEW of 500 g per equivalent, the datasheet further reports the actual AHEW as being 505 g per equivalent. For comparison, the Technical Data Sheet for Jeffamine ED-2003 describes the polyetheramine as being a polyetherdiamine of approximate molecular weight 2000; hence it also has an idealised AHEW of 500 g per equivalent, the datasheet further reports the actual AHEW as being 575 g per equivalent.

The polyamides generally comprise a polyetheramine with an AHEW less than 10 percent higher than the idealized AHEW for the polyetheramine. The polyetheramine is preferably a polyetherdiamine. In one embodiment, the polyetheramine can be an alkylpolyetheramine. In one aspect, the polyetheramine can include aliphatic groups. In still another aspect, the polyetheramine can be Elastamine® RE-2000 (Huntsman International LLC). In one embodiment, the polyetheramine can have the following structure:

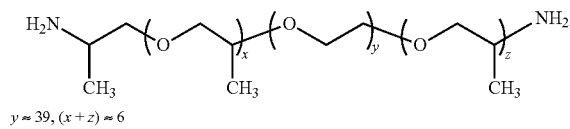

$y \approx 39, (x+z) \approx 6$

In a further embodiment, the polyetheramine can be α,ω-diamino poly(oxyalkylene-co-oxyalkylene ether) copolymer. In one aspect, the α,ω-diamino poly(oxyalkylene-co-oxyalkylene ether) copolymer can be α,ω-diamino poly(oxyethylene-co-oxytetramethylene ether) copolymer, as disclosed in United States Patent Application No. 20120065362A1. Such a polyetheramine can be made by reacting polyethyleneglycol of molecular weight of about 2000 with three to four molecules of propyleneoxide to convert the primary terminal hydroxyl groups to secondary hydroxyl ends.

As discussed herein, a polyetherdiamine can be employed in the polymerization of nylon monomers to form a polyamide which may be spun into nylon yarns which exhibit good hydrophilicity properties. Such properties can impart tactile aesthetics and wear comfort highly desired in the apparel goods manufactured from these yarns.

Furthermore, the polyetheramines can be present in the polyamide and can have various molecular weights depending upon the desired properties of the resulting polymer, including processability as discussed herein. In one embodiment, the polyetheramine can have a molecular weight of at least 1500. In other aspects, the polyetheramine can have a molecular weight of at least 2500, or even at least 5000. Additionally, the polyetheramine can be present in an amount ranging from about 1 wt % to about 20 wt % of the polyamide. In one aspect, the polyetheramine can be present in an amount ranging from about 5 wt % to about 15 wt %, preferably from about 10 wt % to about 15 wt %. In another preferred embodiment, the polyetheramine is present in an amount from about 8 wt % to about 18 wt %.

The polyamides described herein can further comprise a diacid. In one example, the diacid can be aliphatic diacids containing from 6 to 12 carbon atoms, terephthalic acid, isophthalic acid, and mixtures thereof. In one aspect, the diacid can be adipic acid. The diacid can be present in the polymer in an amount to give substantially equimolar proportions of acid groups to amine groups of the polyetheramine. The polyamides described herein can have various physical properties. In one embodiment, the polyamide can have 42 to 49 amine end group gram-equivalents per 1000 kilograms of polymer. Additionally, the polyamide can have a relative viscosity ranging from about 35 to about 45. In another embodiment, the relative viscosity can be calculated based on a formic acid test method according to ASTM D789-86 known at the time of filing the present disclosure in the United States Patent and Trademark Office. The polyamide can have a yellowness index from about 30 to about 45. In a more detailed aspect, the polyamide can have an L* color coordinate from about 75 to about 85. In another aspect, the polyamide can have an a* color coordinate from about −5 to about 5. In still another aspect, the polyamide can have a b* color coordinate from about 5 to about 25.

Whiteness can be determined using a test method conforming to the CIE whiteness rating for each sample. Samples can be measured individually for whiteness (W) and yellowness (Y), using a GRETAG MACBETH "COLOR EYE" reflectance spectrophotometer. First, by determining the CIELAB color coordinates L, a* and b*; and then, calculating W and Y by means know in the art (see: ASTM Method E313-1996 *Standard Practice for Calculating Whiteness and Yellowness Indices from Instrumentally Measured Color Coordinates*). Details of this measurement are found in *Color Technology in the Textile Industry* 2nd Edition, published by Committee RA 36, AATCC (1997); see in this volume: *Special Scales for White Colors* by Harold and Hunter, pp 140-146, and the references therein, all are incorporated herein by reference in their entirety.

Additionally, the polyamides used in the present invention can further comprise a catalyst. In one embodiment, the catalyst can be present in the polyamide in an amount ranging from 10 ppm to 1,000 ppm by weight. In another aspect, the catalyst can be present in an amount ranging from 10 ppm to 100 ppm by weight. The catalyst can include, without limitation, phosphoric acid, phosphorous acid, hypophosphoric acid arylphosphonic acids, arylphosphinic acids, salts thereof, and mixtures thereof. In one embodiment, the catalyst can be sodium hypophosphite, manganese hypophosphite sodium phenylphosphinate, sodium phenylphosphonate, potassium phenylphosphinate, potassium phenylphosphonate, hexamethylenediammonium bis-phenylphosphinate, potassium tolylphosphinate, or mixtures thereof. In one aspect, the catalyst can be sodium hypophosphite.

The polyamides and polyamide compositions disclosed herein may include an "optical brightener." Such an optical brightener can be provided according to the disclosures of United States Patent Application No. 20080090945 A1; POLYAMIDE COMPOSITION WITH IMPROVED HEAT STABILITY AND WHITENESS; to INVISTA NORTH AMERICA S.à r.l.

The polyamides and polyamide compositions suitable for use in the present invention can be improved in whiteness appearance through the addition of an optical brightener. Such polyamides can exhibit a permanent whiteness improvement and can retain this whiteness improvement through operations such as heat setting. In one embodiment, the optical brightener can be present in the polyamide in an amount ranging from 0.01 wt % to 1 wt %.

In another embodiment an improvement in whiteness appearance can be achieved by addition of a delustering agent, the delustering agent can be titanium dioxide.

In addition, these polyamide compositions may contain an antioxidant stabilizer or an antimicrobial additive. Additionally, the polyamide compositions may contain an anti-foaming additive. In one embodiment, the anti-foaming additive can be present in the polyamide in an amount ranging from 1 ppm to 500 ppm by weight.

The polyamides suitable for use in the present invention are inherently acid (anionic) dyeable, but may also be rendered into a basic (cationic) dyeing form by modifying these polymers or copolymers with a cationic dye receptive monomer copolymerized in the polymer. This modification makes compositions particularly receptive to coloration with base (cationic) dyes. 5-sodium sulfoisophthalic acid is an example of such a cationic dye receptive monomer.

The polyamides described herein may be produced by a process comprising contacting a diacid, a polyetheramine, and a nylon salt; forming a mixture; heating the mixture in a closed vessel to a temperature and autogenous pressure sufficient to cause polymerization of the mixture; and forming the polyamide.

The process for producing the polyamidescan further comprise providing to the mixture a catalyst, including those discussed herein. The process for producing the polyamides can further comprise providing an anti-foaming additive to the mixture. The process for producing the polyamides can further comprise providing an optical brightener to the mixture.

Generally, the nylon monomers of the polyamide can be added as a salt, aminoacid, or lactam. The nylon monomer can be a nylon 6,6 salt and can be present in the polyamide in an amount ranging from about 50 wt % to 95 wt %.

Various processing parameters can be used in the polymerization of the polyamides including temperature and pressure. The temperature can range from about 190° C. to about 290° C. and the autogenous pressure can range from about 250 pounds per square inch absolute (psia) to about 300 pounds per square inch absolute (psia). Additionally, the heating can be performed under partial vacuum. The partial vacuum attained is subject to autoclave design and economic considerations with the process.

Generally, the polymerization can involve various serial heating cycles. Such cycles can individually comprise a heating temperature profile and a pressure profile. Generally the intent is to keep the system fluid through a combination of temperature for sufficient melt, and water content for sufficient solubility. The serial heating cycles can comprise: a first heating cycle (C1) having a temperature starting between 170 to 215° C. and finishing between 190 to 230° C. over a period of 20 to 40 minutes under a pressure of between 130 to 300 psia; a second heating cycle (C2) having a temperature starting between 190 to 230° C. and finishing at between 240 to 260° C. over a period of 20 to 45 minutes under a pressure of between 130 to 300 psia; a third heating cycle (C3) having a temperature starting between 240 and 260° C. and finishing between 250 to 320° C. over a period of between 15 to 45 minutes under a pressure of between 300 psia to atmospheric pressure; and a fourth heating cycle (C4) having a temperature starting between 250 to 320° C. and finishing between 250 to 320° C. over a period of 15 to 80 minutes under a pressure of between atmospheric pressure and about 200 mBar absolute vacuum. Finally the polymer is extruded using methods well known in the art. Generally, the polyamide composition is inherently acid dyeable and may, as an option, comprise a cationic dyeable polymer. The polyamide composition can contain polyhexamethylene adipamide (nylon 6,6), or polycaproamide (nylon 6), or copolymers of either of these.

Generally, the process for producing the polyamide composition may be made by an autoclave process. The process may start with a concentrated slurry (the term slurry also incorporating the concept of a solution) prepared from an aqueous solution of a nylon salt, aminoacid or lactam or mixtures of e.g., a nylon 6,6 salt, that is provided to an autoclave vessel. Optionally, the slurry may be dilute and become more concentrated by means of an evaporation step. The slurry may be prepared from an aqueous solution of the monomers, such as, hexamethylene diamine and adipic acid, in the manner known in the art. In another specific embodiment, the slurry may contain a minor amount of nylon 6 monomer with the aqueous solution of the nylon 6,6 monomers in the form of an aqueous caprolactam solution. The optionally added aqueous caprolactam solution may be mixed with the nylon salt in an amount to provide a nylon 6 content of about 0.5 wt % to about 10 wt %. In another specific embodiment the slurry may contain the polyetheramine along with a quantity of diacid to give substantially equimolar proportions of acid groups to amine groups of the polyetheramine. The autoclave vessel may then be heated to about 230° C. (or some other functional temperature) allowing the internal (autogenous) pressure to rise. A delusterant, titanium dioxide ($TiO_2$) may optionally be injected into the autoclave and monomer mixture as an aqueous dispersion.

In one embodiment, an aqueous dispersion of a polyetheramine may be injected to the mixture in the autoclave vessel along with a quantity of a diacid, e.g., adipic acid, to give substantially equimolar proportions of acid groups to amine groups of the polyetheramine The mixture may then be heated in the autoclave to about 245° C. (or some other functional temperature). While at this temperature, the autoclave pressure may be reduced to atmospheric pressure and further reduced in pressure by application of a vacuum in the known manner, to form the polyamide composition. The autoclave, containing the polyamide composition, would be maintained at this temperature for about 30 minutes. This step may be followed by further heating of the polyamide polymer composition in the autoclave to about 285° C., for example, and introducing dry nitrogen to the autoclave vessel and pressurizing the autoclave by introducing dry nitrogen to about 4 to about 5 bar absolute pressure. The polymer composition may be released from the autoclave by opening a port in the autoclave vessel and allowing the molten polyamide composition to flow from the vessel in the form of laces. These laces may be cooled and quenched the in a current of water. Next, the laces of polyamide polymer may be granulated by known means and further cooled with water.

The autoclave process described above can provide a polyamide composition with a formic acid method RV of about 25 to about 60. In another embodiment, the autoclave process described above can provide a polyamide composition with a formic acid method RV of about 38 to about 45.

Optionally, the process may be modified to make a polyamide composition having about 25 to about 130 gram equivalents of amine ends per 1000 kilograms of polymer, provided by the addition of an excess of an aqueous hexamethylene diamine solution to the aqueous solution of nylon salt.

The nylon polymers and copolyamides described herein can be inherently acid-dyeable. In one embodiment, the number of free amine end groups (AEG) in these polymers is at least 25 gram equivalents per 1000 kilograms of nylon polymer. In order to make the polymers more deeply acid dyeing, an enhanced level of free amine end groups can be utilized. More deeply acid dyeing nylon polymers have an enhanced AEG level, e.g., at least 35 gram equivalents per 1000 kilograms of nylon polymer or AEG levels of 60 to 130 gram equivalents per 1000 kilograms of nylon polymer may be used.

Furthermore, it is noted that a masterbatch of polyetheramine comprising the amine end equivalent of a suitable diacid, e.g. adipic acid, can be made. This masterbatch can then be provided to the autoclave process. In an alternative embodiment, the polyamide composition may be made by a masterbatch process in which a flake or melt form is used comprising a polyetheramine dispersed in nylon, either nylon 6,6 or nylon 6. The flake or melt form is then subsequently added as a masterbatch comprising the nylon. In an embodiment, the masterbatch nylon flake containing the polyetheramine and the nylon, in flake form, are both melted. In an embodiment, the nylon flake containing polyetheramine is melted and added to the nylon melt. In either case, the melt is forced from an extruder to a pump, which pumps the polyamide compositions to a pack and a spinneret for making the apparel textile yarns of the invention.

The nylon polymers and copolyamides described herein may also be rendered into a basic dyeing form, i.e., receptive to coloration with base dyes also called cationic dyes. Such base-dyeing compositions are made from polyamide polymer with a cationic dye modifier copolymerized in the polymer. U.S. Pat. No. 5,164,261 to Windley describes the preparation of such cationic dye modified polyamides. In one embodiment, the polymer can be modified during polymerization with from 0.5 wt % to 4 wt % of a cationic dye modifier, e.g., 5-sulfoisophthalic acid. Typically, a weighed quantity of the sodium salt of 5-sulfoisophthalic acid can be combined with a known amount of the polyamide precursor salt in an autoclave using standard polymerization procedures known in the art. In one embodiment, the amount of cationic dye modifier present in the polymer can be from about 0.75 wt % to about 3 wt %, as determined by total sulfur analysis of the polymer. This amount of cationic dye modifier is reported as equivalent sulfonate groups. The sulfonate group concentration can be at least 25 gram equivalents per 1000 kilograms polymer up to about 150 gram equivalents per 1000 kilograms polymer.

In one embodiment, the polyetheramine can be provided to the polyamide composition, and hence inherent to the apparel textile yarn itself when formed into a fabric, as opposed to being applied on a fabric. In one embodiment, the apparel textile yarn of the present invention exhibits improved hydrophilic properties as measured by various water wicking and moisture regain tests.

Typically, the yarn herein can be a multifilament textile yarn in the form of either a low orientation yarn (LOY), a partially oriented yarn (POY) or a fully drawn yarn (FDY). The yarn may be a textured yarn made from partially oriented yarn. Moreover, the yarn may be substantially continuous, i.e. formed by one or more continuous filaments. In other embodiments, a continuous filament can be cut into staple fibers and the latter can be converted into a continuous thread by a spinning process, resulting in a continuous article of manufacture or comprised of shorterfibers. Such yarns may be used to make fabrics, woven, nonwoven or knitted articles of manufacture, which in turn may be used to make garments.

In one embodiment, apparatuses and methods for spinning yarns are disclosed in U.S. Pat. No. 6,855,425, and similar techniques can be likewise in the context of the polyamides prepared and described herein.

The yarns prepared are apparel textile yarns for apparel fabric applications. That is to say, yarns having a yarn weight of from 5 to 300 dtex, and a filament weight of from 0.5 to 7 dtex can be desirable. In certain embodiments, the yarn comprises from 1 to 300 filaments. In some embodiments the yarn comprises from 3 to 150 filaments.

According to some embodiments the yarn has a DPF (dtex per filament) from 0.5 to 2.5, for example from 1 to 1.5.

In one embodiment, the yarns can have a filament uniformity in Uster percent (U %) of 1.5% or less, more typically 1% or less. Such uniformity can be desirable in order for the yarn to have the high appearance uniformity needed for apparel applications, and also to reduce yarn breaks in texturing, weaving and knitting operations.

In another embodiment, the yarns have an elongation to break of from 20% to 120%. According to some embodiments the yarns have an elongation to break from 20% to 90%. Typically, the yarns have a tenacity of from 25 to 65 cN/tex, for example from 30 to 45 cN/tex. These tensile properties are all desirable for apparel textile applications.

In certain embodiments, the yarn of the polyamide can have a titanium dioxide content less than 0.1 wt %, and more typically, less than 0.01 wt %, giving the yarn a clear or bright luster. In other embodiments, the yarn of the polyamide can have a titanium dioxide content greater than 0.3 wt % and or even greater than 2 wt %, giving the yarn a matt or dull luster. Titanium dioxide content between these ranges can also be used, e.g., from 0.1 wt % to 0.3 wt %, as well.

Apparel textile yarns of the present invention may be prepared by using known melt spinning process technology. With such technology, the granulated polyamide composition made by using the autoclave process, or the melt made by the masterbatch process, can both have an optical brightener therein as described above, and can be provided to the spinning machine. The molten polymer is forwarded by a metering pump to a filter pack, and extruded through a spinneret plate containing capillary orifices of a shape chosen to yield the desired filament cross-section at the spinning temperature. These cross-sectional shapes known in the art can include circular, non-circular, trilobal, hollow and diabolo shapes. Typical hollow filaments can be produced as disclosed in U.S. Pat. No. 6,855,425. Spinning temperatures can range from 270° C. to 300° C., for example. The bundle of filaments emerging from the spinneret plate is cooled by conditioned quench air, treated with spin finish (an oil/water emulsion), optionally interlaced, e.g. using an interlacing air jet.

In some embodiments the continuous yarn thus obtained is cut and transformed into staple fibers, which are subsequently used to produce threads or yarns by spinning, or for manufacturing nonwovens, by hydro-entanglement, needlepunching, ultrasonic bonding, chemical bonding, heat bonding or the like.

In the case of FDY, the in-line processing on the spinning machine typically includes making several turns around a set of Godet rolls (feed rolls), the number of turns being sufficient to prevent slippage over these rolls, then passing the yarn over another set of rolls (draw rolls) rotating at sufficient speed to stretch the yarn by a predetermined amount (the draw ratio). Finally, the process is continued by heat setting and relaxing the yarn with a steam-box before winding up at a speed of at least 3000 m/min, preferably at least 4000 m/min, for example 4800 m/min or more. Optionally, an alternative heat setting (or relaxing) method can be used, such as heated rolls, and an additional set of Godet rolls may be incorporated between draw rolls and winder to control the tension while the yarn is set or relaxed. Also, optionally, a second application of spin finish and/or additional interlacing may be applied before the final winding step.

In the case of POY, the additional in-line processing typically includes only making an S-wrap over two Godet rolls rotating at the same speed, and then passing the yarn to a high speed winder, winding at a speed of at least 3000 m/min, preferably at least 4000 m/min, for example 4800 m/min. Use of the S-wrap is beneficial to control tension, but not essential. Such a POY may be used directly as a flat yarn for weaving or knitting, or as a feedstock for texturing.

The LOY spinning process is similar to POY except that a windup speed of 1000 m/min or below is used. These low orientation yarns, in general, are further processed via a second stage, e.g., on a conventional draw-twister or draw-wind machine.

In one embodiment, the polyamide polymer disclosed herein can be highly suited for spinning into continuous filaments which may be converged to form multifilament yarns. The process of spinning synthetic polymers as continuous filaments and forming multifilament yarns is known to the skilled person. In general, successful spinning of filaments uses a spinneret plate having at least a single capillary orifice. The capillary orifices correspond to each individual filament comprising the yarn. Circular and non-circular cross-section spinneret capillary orifices (or extrusion orifice) are employed depending upon the cross sectional shape sought for the filament. In general, for a certain polymer throughput G (e.g., in grams per minute) per capillary, the following equation applies:

$$G = \rho_{(melt)} D^2_{(capillary)} (\pi/4) v_{(extrusion)} \quad \text{Equation 1.}$$

In this equation, $\rho$ is the polymer melt density (e.g., for melted nylon 6,6 at 290° C. equal to 1.0 gram per cm$^3$), D is the diameter (equal to twice the radius) of the capillary assuming a circular orifice, and v is the velocity of the filament.

The extrusion velocity is given by the following equation:

$$v_{(extrusion)} = G(4/\pi) D^2_{(capillary)} \rho_{(melt)} \quad \text{Equation 2.}$$

In one embodiment, the polymer is extruded at an extrusion velocity in the range of 20 centimeters per second to 80 centimeters per second. In another embodiment, the freshly extruded filaments can be quenched with conditioned air in the known manner. In this step, the individual filaments are cooled in a quench cabinet with a side draft of conditioned air and converged and oiled with a primary finish, as known in the art, into a yarn. The yarn is forwarded by feed roll onto a draw roll pair where the yarn is stretched and oriented to form a drawn yarn which is directed by roll into a yarn stabilization apparatus. Such a stabilization apparatus is common to the art and here optionally employed as a yarn post-treatment step. Finally, the yarn is wound up as a yarn package at a yarn speed in the range of 1000 to 6500 meters per minute. The yarn RV (or relative viscosity by the formic acid method) is about 51 to about 54.

In an embodiment, the yarn is a drawn yarn with elongation of 22% to about 60%, the boiling water shrinkage is in the range of 3% to about 10%, the yarn tenacity is the range of 3 to about 7 grams per denier, and the RV of the yarn can be varied and controlled well within a range of about 40 to about 60. The yarn is a dull luster multifilament polyamide yarn.

A derived parameter characterizing the superior properties of this yarn is called the Yarn Quality and found by the product of the yarn tenacity (grams per denier) and the square root of the % elongation, as in Equation 3.

$$\text{YARN QUALITY} = \text{tenacity} \times (\text{elongation})^{1/2} \quad \text{Equation 3.}$$

The Yarn Quality is an approximation to the measure of yarn "toughness." As is known to those skilled in the art, the area under the yarn load elongation curve is proportional to the work done to elongate the yarn. Where tenacity is expressed in terms of force per unit denier, for example, and the elongation expressed as a percent change per unit of length, the load elongation curve is the stress-strain curve. In this case the area under the stress-strain curve is the work to extend the yarn or the yarn toughness. The yarn quality improvement provides an apparel polyamide yarn which is more acceptable in varied applications. These applications may include, without limitation, warp knit fabrics, circular knit fabrics, seamless knit garments, hosiery products, non-woven fabrics and light denier technical fabrics.

In some embodiments the yarn is a multi-component yarn, wherein each filament is comprised of two or more portions made of different materials. At least one of these portions is made of the polyamide comprising nylon and polyetherdiamine. A second or further portion of each filament can be made of a polymer different from said polyetherdiamine-containing polyamide. For instance, a core made of nylon 6 or nylon 6,6 can be entirely or partly surrounded by or embedded in a skin made of the polyetherdiamine-containing polyamide, forming a bi-component filament having a skin-core structure. The skin portion of the bi-component fiber is preferably formed by the hydrophilic polietherdiamine-containing polyamide.

In other embodiments, the two components can be arranged side-by-side in the cross section of the filament, forming a bi-component filament having a side-by-side structure. The second component of a bi-component filament can have a lower moisture regain than the polyetherdiamine-containing polyamide. The total moisture regain of the bi-component fiber yarn will in this case be lower than a mono-component yarn, but other valuable and desirable features can be obtained, such as a lower basis weight. According to some embodiments, a bi-component fiber can include from 10% wt to 95% wt of polyetherdiamine-containing polyamide as disclosed herein, and from 90% wt to 5% wt of a second component, e.g. polypropylene. According to yet further embodiments, bi-components fibers are provided, containing from 50% wt to 80% wt of polyetherdiamine-containing polyamide as disclosed herein, and from 50% wt to 20% wt of a second component.

In certain embodiments, the polyamide yarns have different dyeing characteristics with anionic dyes or cationic dyes. These dyeing characteristics may arise from different numbers of amine end groups. The concentration of amine end groups (AEG) influences how deeply the polyamide is dyed by anionic dyes. Alternatively or additionally, the polyamides may contain anionic end groups, such as sulfonate or carboxylate end groups, that render the polyamide cationic-dyeable.

In certain embodiments, the polyamide yarns are dyed with fiber reactive dyes which incorporate vinylsulfonyl and/or β-sulfatoethylsulfonyl groups. Such fiber reactive dyes are known from U.S. Pat. No. 5,810,890.

In certain embodiments, the polyamide yarns are dyed with fiber reactive dyes which incorporate halogen derivatives of nitrogen hetrocyclic groups, such as, triazine, pyrimidine and quinoxaline. Such fiber reactive dyes are described, for example, in U.S. Pat. No. 6,869,453.

In other embodiments, the filaments comprise an amine component of hexamethylene diamine.

In other embodiments, the filaments comprise an amine component which is a mixture of hexamethylene diamine with at least 20 wt % of methyl pentamethylene diamine based on the total weight of diamine.

In still other embodiments, the polyamides may comprise nylon 6.

The following testing discussion can be used to characterize the various parameters as discussed herein. Yarn tenacity and the yarn elongation can be determined according to ASTM method D 2256-80 (known at the time of filing the present disclosure with the United States Patent and Trademark Office) using an INSTRON tensile test apparatus (Instron Corp., Canton, Mass., USA 02021) and a constant cross head speed. Tenacity is expressed as centiNewtons per tex grams of force per denier, and the elongation percent is the increase in length of the specimen as a percentage of the original length at breaking load.

Yarn linear density evenness, also known as the yarn Uster percent (U %), can be determined using a Uster evenness tester 3, type C, which is known in the art to the skilled person.

Polymer amine ends can be measured by directed titration with standardized perchloric acid solution of weighed polymer samples taken up in solution after filteration to remove insoluble delustering pigments.

The moisture regain of a polymer is measured by the following method. A sample of the polymer (100 g) is dried for 18 hours at 80° C. under vacuum. The initial moisture level of this dried polymer sample is preferably measured using an Aquatrac (PET version (4 Digit); Brabender Messtechnik) at 160° C. setting on about 1.9 g polymer. A moisture level measured using this method of less than 0.5 w % was taken to indicate that the polymer had been dried sufficiently.

The dried sample is then immersed in demineralised water (500 g) at ambient temperature (20° C.) without any agitation. After 48 hours a sample is removed (approx. 10 g) and patted dry with an absorbent tissue. A portion of the sample (approx. 5 g; weight of wet sample) is weighed accurately into a foil dish and placed in an oven at 80° C. under vacuum for 18 hours. The dish is removed and placed in a desiccator to cool, and then reweighed (weight left after drying). This procedure was repeated at intervals thereafter (e.g. 72, 144, 190 and 220 hours) up to 220 hours. Moisture uptake was determined by the following calculation:

$$\frac{\text{weight of wet sample} - \text{weight left after drying}}{\text{weight of sample after drying}} \times 100 = \% \text{ uptake}$$

The moisture regain of the polymer is defined as the moisture uptake after 220 hours or until the sample has reached moisture uptake equilibrium (which is defined as a weight change of no more than 1% in a 24 hour period), whichever is the earlier. Thus, if moisture uptake equilibrium has not been reached by 220 hours the moisture regain is the moisture uptake at 220 hours. When the moisture uptake equilibrium is reached before 220 hours, the moisture regain is the average (mean) of the moisture uptake for the first two consecutive measurements taken at equilibrium.

The water wicking rates of fabrics constructed from the yarn can be measured by vertically immersing the bottom 1.8 inches (4.6 cm) of a one inch (2.5 cm) wide strip of the scoured fabric in de-ionized water, visually determining the height of the water wicked up the fabric, and recording the height as a function of time. "Initial wicking rate" means the average wicking rate during the first two minutes of the wicking test.

A fabric or garment "Percent Dry Time" test can be used to characterize the hydrophilic polyamide yarns, fabric and garments herein. Also known as percent dry time tests or "horizontal wicking" determinations. Percent dry time tests are done using a balance and computer; e.g., Mettler balance AE163 and computer running a Mettler BalanceLink 3.0 program. The weight of a circular sample of fabric 2 inches (5.1 cm) in diameter is obtained and recorded. Using an automated pipette, 0.10 gram of tap water is placed on the balance and its weight recorded. The circular fabric sample is immediately centered over and then placed on the water. The total weight of fabric and water is recorded at that time (time=zero minutes) and every two minutes thereafter for the next 30 minutes. Percent dry results for a given time are calculated according to the following formula: % Dry=100−[$W_{total}-W_{fabric}$)/$W_{H2O}$]×100.

Synthesis of Polyamides

The following syntheses are put forth so as to provide those of ordinary skill in the art with a complete disclosure and description of how to perform the methods and use the compositions and compounds disclosed herein to obtain apparel textile yarns according to the invention. Efforts have been made to ensure accuracy with respect to numbers (e.g., amounts, temperature, etc.), but some errors and deviations should be accounted for. Unless indicated otherwise: parts are parts by weight, temperature is in ° C., and pressure is in atmospheres. Standard temperature and pressure are defined as 25° C. and 1 atmosphere.

Synthesis 1—Polyamide with 5 wt % Polyetheramine

Salt Prep 8380 g demineralized water was charged to flask and warmed to 35° C. 27 g (0.185 mol) of adipic acid was charged and stirred to dissolve. 460 g of 80% Elastamine® RE2000 aqueous solution was charged, followed by 8077 g of nylon 6,6 salt. The flask was left stirring until dissolved. A sample was taken and diluted, and the pH at 9.5% solids (approx.) was checked and adjusted to the desired pH with HMD (or adipic acid)—initially pH 8.3 then lowered to 8.1 as feedback of results of amine end groups (AEG) on polymer showed AEG was a bit too high. Solids were checked using an IR heater moisture balance. The mixture was left stirring overnight at 35° C.

Polymerization

The Salt Prep solution was added to a 24 L autoclave and 0.3 g of 48% aqueous Silwet L7605 antifoam (~20 ppm on final polymer) was added. 0.17% of Hombitan M titanium dioxide as a 40 wt % slurry was also added during serial heating Cycle 2 (C2). The polymer is targeted to have RV 40; AEG 45; 0.17% TiO2 and containing 5 wt % Elastamine® RE2000.

For the polymerization, no evaporator was used, but rather a serial heating cycle 0 (C0) was developed to provide a position of salt concentration similar to an evaporator batch—essentially in "C0," the mixture was heated up to around 185° C. and vented at 137 psia for a period of 87 minutes while the temperature was raised to 197° C. before going into serial heating cylcle (C1).

The process for the serial heating cycles was as follows: C1—T started about 197° C. finished 220° C., pressure reaching 265 psia defines end of C1, took about 18 mins; C2—265 psia held for 22 mins, T was raised to 242° C.; serial heating cycle 3 (C3)—pressure let down to 14.5 psia (atm) over 35 mins, temperature was raised to final temperature of 275° C.; serial heating cycle 4 (C4)—6 mins at atm pressure while vacuum system being set up manually, applied vacuum of 400 mbar for 30 mins, then released with nitrogen back to atmospheric and held for 5 mins. The polymer was then cast. In certain cycle, polymer vacuum only held for 25 mins as the polymerizing was slightly too much as evidenced by RV. Four polymers were manufactured and characterized with the results provided in Table 1.

TABLE 1

| Batch Number | RV (target 40 +/− 3) | AEG (target 45 +/− 3) | L* | a* | b* | YI (yellowness Index) |
|---|---|---|---|---|---|---|
| 1 | 42.22 | 48.25 | 80.65 | −0.25 | 11.13 | 25.84 |
| 2 | 42.92 | 46.55 | 79.78 | 0.56 | 14.63 | 31.25 |
| 3 | 39.65 | 45.82 | 80.56 | 0.18 | 12.43 | 28.1 |
| 4 | 39.42 | 45.65 | 80.77 | 0.04 | 12.69 | 28.54 |

Figure 2:
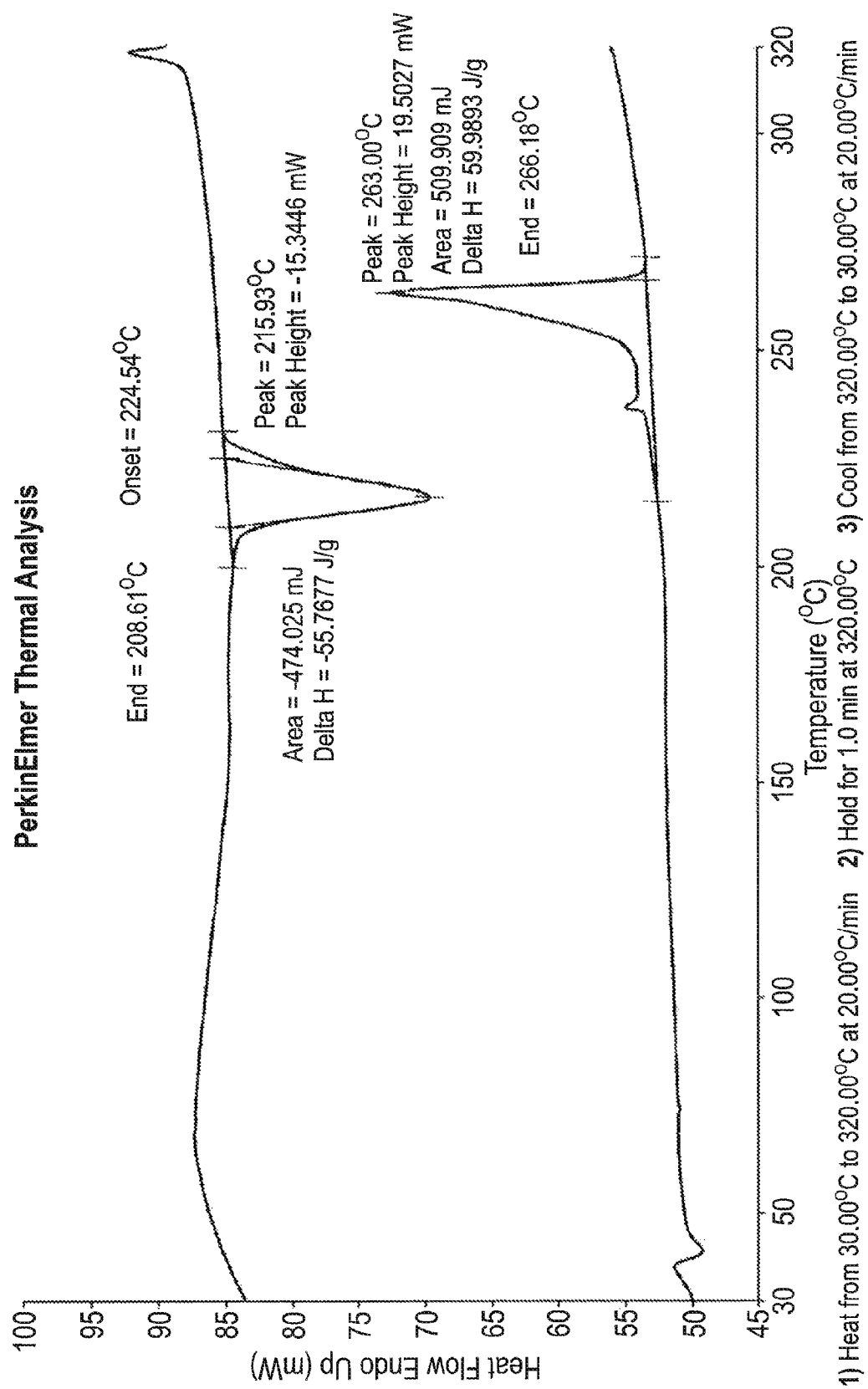
FIG. 2 is a differential scanning calorimetry (DSC) plot of a polyamide used in the present invention.

A DSC trace of batch number 1 is provided in FIG. 1. A DSC trace of batch number 1 after reheat is provided in FIG. 2.
Synthesis 2—Polyamide with 10 wt % of Polyetheramine
  Salt Prep
  8223 g demineralized water was charged to flask and warmed to 35° C., 54 g (0.37 mol) of adipic acid was charged and stirred to dissolve, and 920 g of 80% Elastamine® RE2000 aqueous solution was charged, followed by 7627 g of nylon 6,6 salt. The flask was left stirring until dissolved. A sample was taken and diluted, and a pH at 9.5% solids (approx.) was checked and adjusted to the pH between 8.3-8.1 with HMD (or adipic acid). Solids were checked using an IR heater moisture balance. The mixture was left stirring overnight at 35° C.
  Polymerization
  The Salt Prep solution was added to a 24 L autoclave. 2.51 g of sodium hypophosphite monohydrate was added (to give 100 ppm P in final polymer), as was 0.3 g of 48% aqueous Silwet L7605 antifoam (~20 ppm on final polymer). 0.17% of Hombitan M titanium dioxide as a 40 wt % slurry was added during serial heating cycle 2 (C2). The polymer is is targeted to have RV 40; AEG 45; 0.17% TiO2 and containing 10 wt % Elastamine® RE2000.
  For the polymerization, no evaporator was used, but rather a serial heating cycle 0 (C0) was developed to provide a position of salt concentration similar to an evaporator batch—essentially in "C0" the mixture was heated up to around 185° C. and vented at 137 psia for a period of 90 minutes while the temperature was raised to 197° C., before going into serial heating cycle 1 (C1).
  The process for the serial heating cycles was as follows: C1—T started about 202° C. finished 221° C., pressure reaching 265 psia defines end of C1; C2—265 psia held for 24 mins, T was raised to 244° C.; serial heating cycle 3 (C3)—pressure let down to 14.5 psia (atm) over 25 mins, temperature was raised to final temperature of 274° C.; and serial heating cycle 4 (C4)—11 mins at atm pressure while vacuum system being set up manually, applied vacuum of 350 mbar for 24 mins, then released with nitrogen back to atmospheric and held for 6 mins. The polymer was then cast. For batch numbers 6-10 in Table 2, the antifoam was 40 ppm. For batch numbers 6-9 in Table 2, the pressure was dropped at the end of C2 to 218 psia before going into C3. The polymers manufactured were characterized with the results provided in Table 2.

TABLE 2

| Batch Number | RV (target 40 +/− 3) | AEG (target 45 +/− 3) | L* | a* | b* | YI (yellowness Index) |
|---|---|---|---|---|---|---|
| 5 | 36.62 | 44.39 | 75.41 | 2.56 | 21.59 | 41.5 |
| 6 | 42.0 | 45.2 | 75.43 | 3.38 | 22.12 | 42.8 |
| 7 | 41.1 | 44.6 | 77.46 | 2.78 | 22.05 | 41.78 |

TABLE 2-continued

| Batch Number | RV (target 40 +/− 3) | AEG (target 45 +/− 3) | L* | a* | b* | YI (yellowness Index) |
|---|---|---|---|---|---|---|
| 8 | 42.2 | 46.6 | 76.70 | 3.41 | 21.97 | 42.65 |
| 9 | 41.1 | 45.5 | 75.62 | 3.22 | 22.11 | 42.85 |
| 10 | 43.2 | 46.0 | 74.92 | 2.89 | 23.52 | 45.46 |

Figure 3:
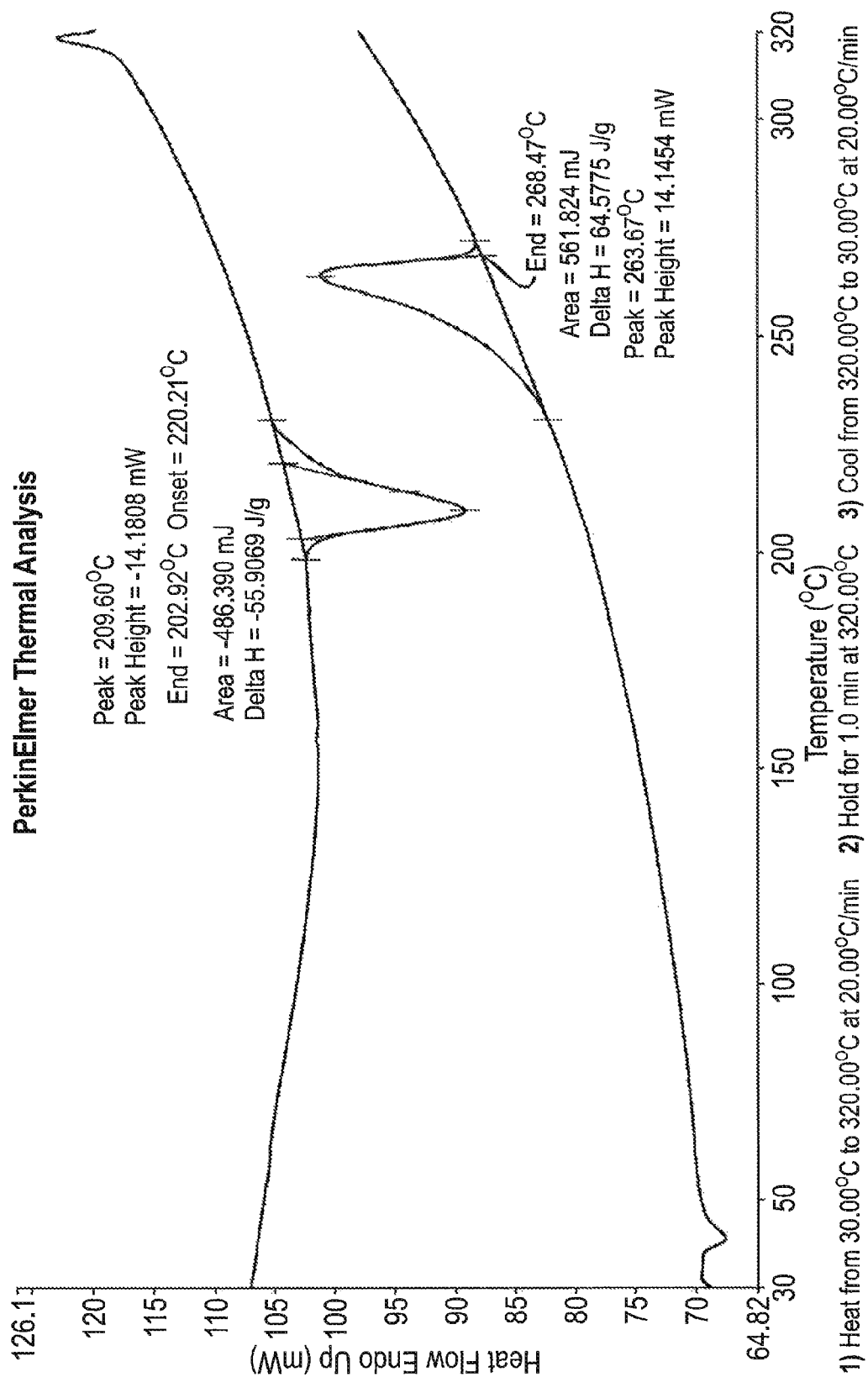
FIG. 3 is a differential scanning calorimetry (DSC) plot of a polyamide used in the present invention.
Figure 4:
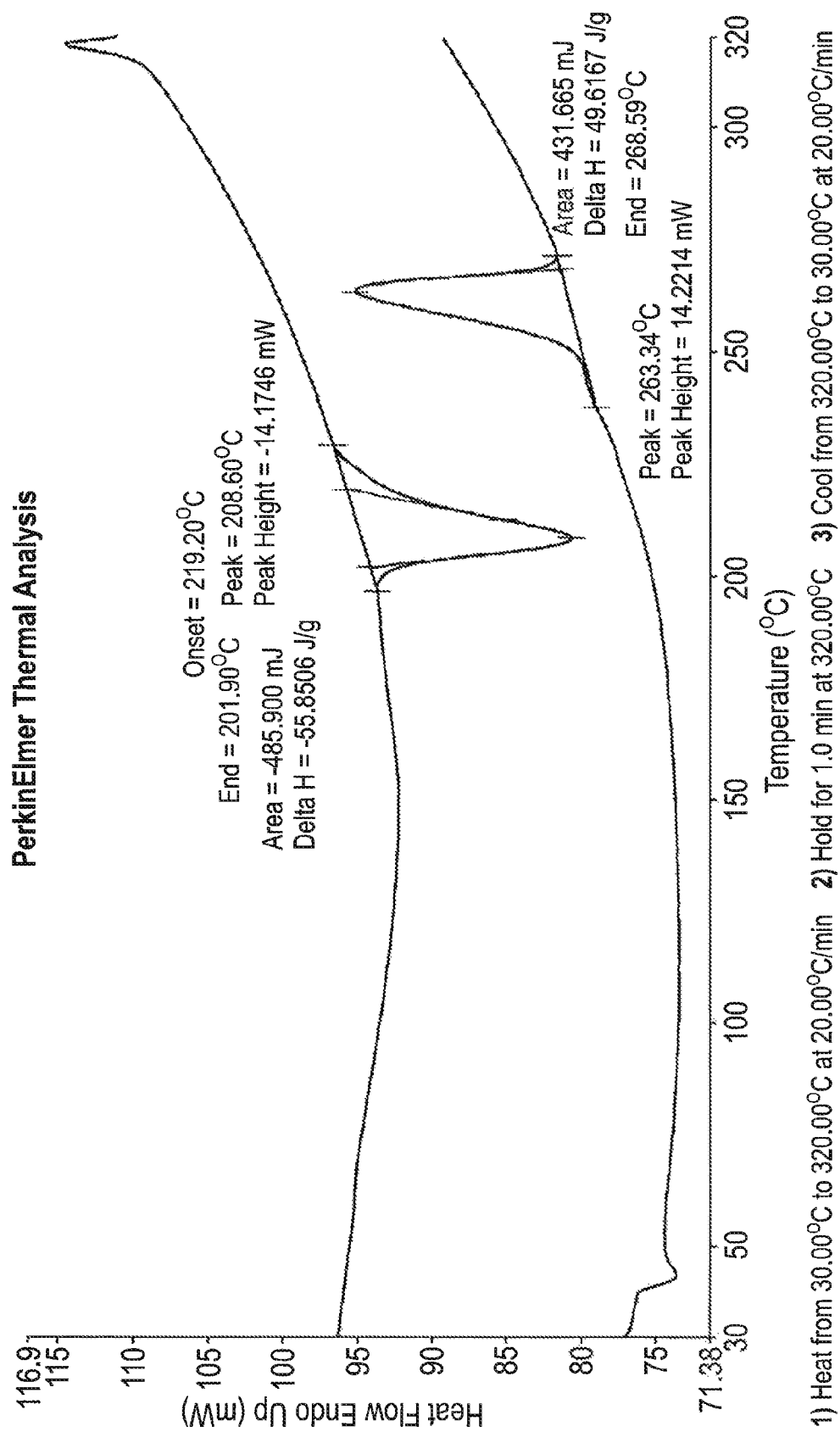
FIG. 4 is a differential scanning calorimetry (DSC) plot of a polyamide used in the present invention.
Figure 5:
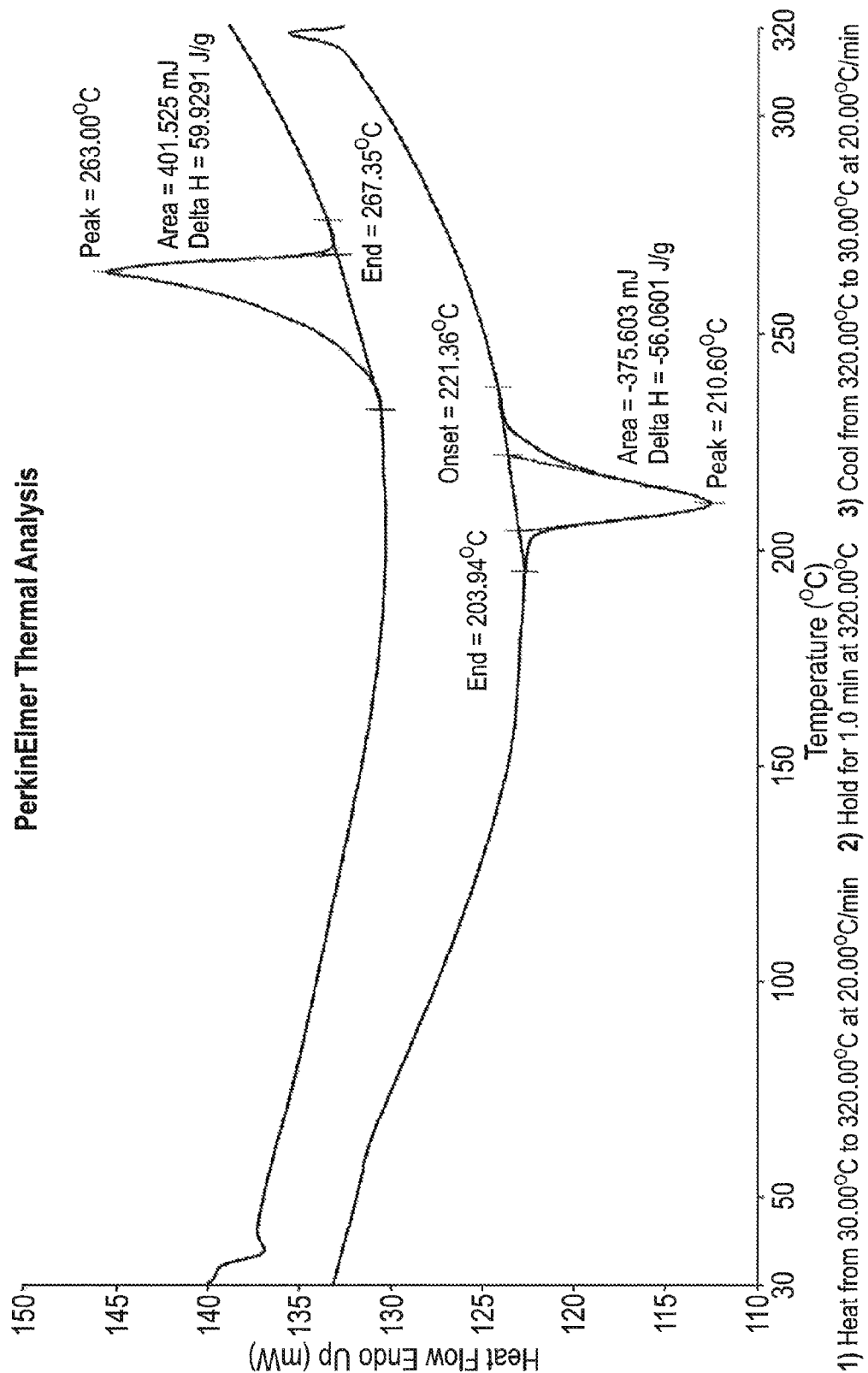
FIG. 5 is a differential scanning calorimetry (DSC) plot of a polyamide used in the present invention.

A DSC trace of batch number 5 is provided in FIG. 3. A DSC trace of batch number 5 after reheat is provided in FIG. 4. A DSC trace of batch number 6 is provided in FIG. 5.
Synthesis 3—Polyamide with 15 wt % of Polyetheramine
  Salt Prep
  8362 g demineralized water was charged to flask and warmed to 35° C., 81 g (0.555 mol) of adipic acid was charged and stirred to dissolve, and 1380 g of 80% Elastamine® RE2000 aqueous solution was charged, followed by 7177 g of nylon 6,6 salt. The flask was left stirring until dissolved. A sample was taken and diluted, and a pH at 9.5% solids (approx.) was checked and adjusted to pH 8.1 with HMD. The solids were checked using an IR heater moisture balance. The mixture was left stirring overnight at 35° C.
  Polymerization
  The Salt Prep solution was added to a 24 L autoclave. 2.51 g of sodium hypophosphite monohydrate was added (to give 100 ppm P in final polymer), as was 0.62 g of 48% aqueous Silwet L7605 antifoam (~40 ppm on final polymer). 0.17% of Hombitan M titanium dioxide as a 40 wt % slurry was added during serial heating cycle 2 (C2). The polymer is targeted to have RV 40; AEG 45; 0.17% TiO2 and contains 15 wt % Elastamine® RE2000.
  For polymerization, no evaporator was used. Rather, a serial heating cycle 0 (C0) was developed to provide a position of salt concentration similar to an evaporator batch—essentially in "C0" the mixture was heated up to around 185° C. and vented at 137 psia for a period of 87 minutes while the temperature was raised to 197° C., before going into serial heating cycle 1 (C1).
  The process for the serial heating cycles was as follows: C1—T started about 197° C. finished 220° C., pressure reaching 265 psia defines end of C1, took about 17 mins; C2—265 psia held for 25 min, T was raised to 243° C.; serial heating cycle 3 (C3)—pressure let down to 14.5 psia (atm) over 36 mins, temperature was raised to final temperature of 275° C.; and serial heating cycle 4 (C4)—5 mins at atm pressure while vacuum system being set up manually, applied vacuum of 350 mbar for 30 mins, then released with nitrogen back to atmospheric and held for 10 mins. The polymer was then cast. The polymer was characterized with the results provided in Table 3.

TABLE 3

| Batch Number | RV (target 40 +/− 3) | AEG (target 45 +/− 3) | L* | a* | b* | YI (yellowness Index) |
|---|---|---|---|---|---|---|
| 11 | 30.32 | 53.82 | 75.13 | 4.21 | 25.5 | 47.23 |

Figure 6:
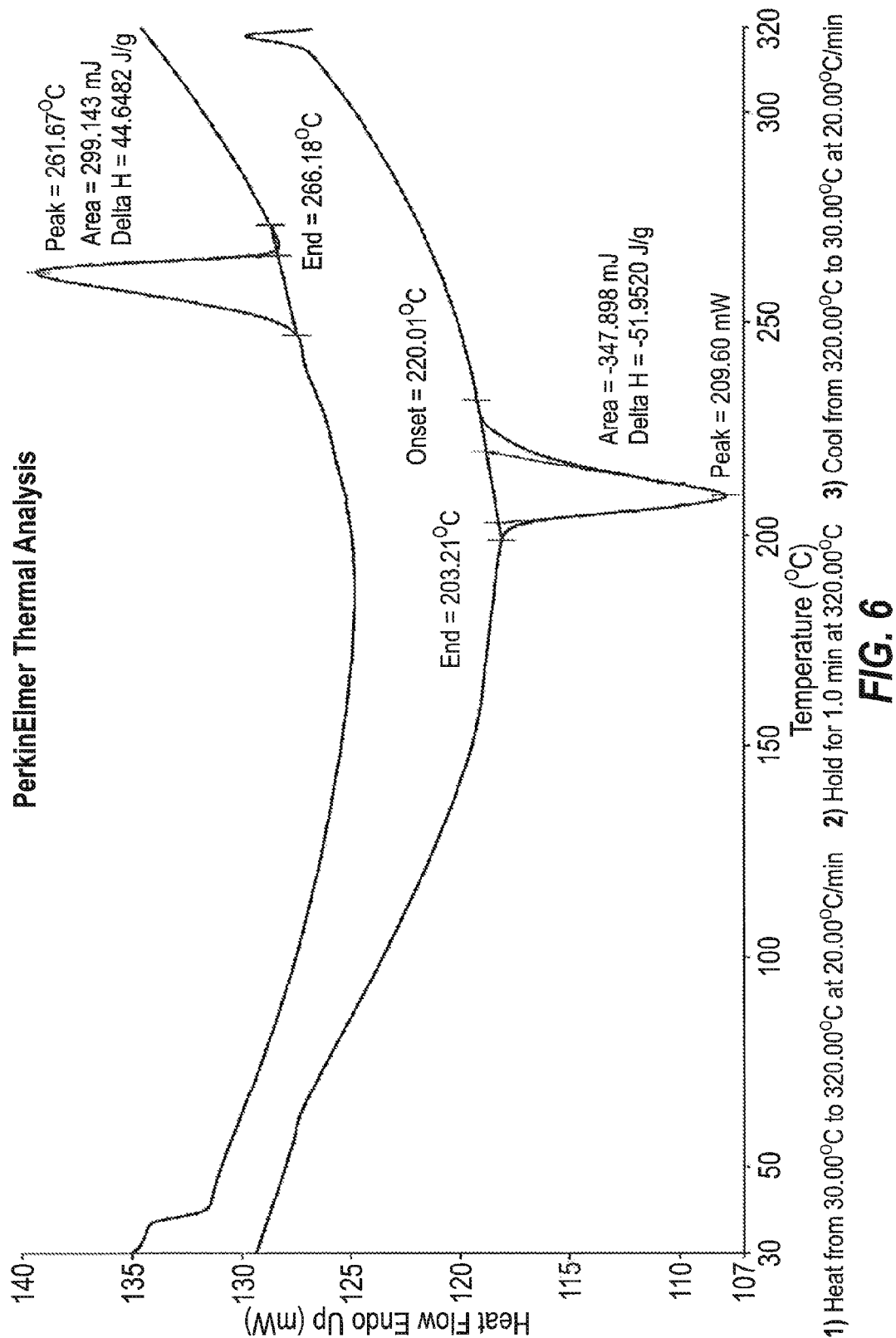
FIG. 6 is a differential scanning calorimetry (DSC) plot of a polyamide used in the present invention.
Figure 7:
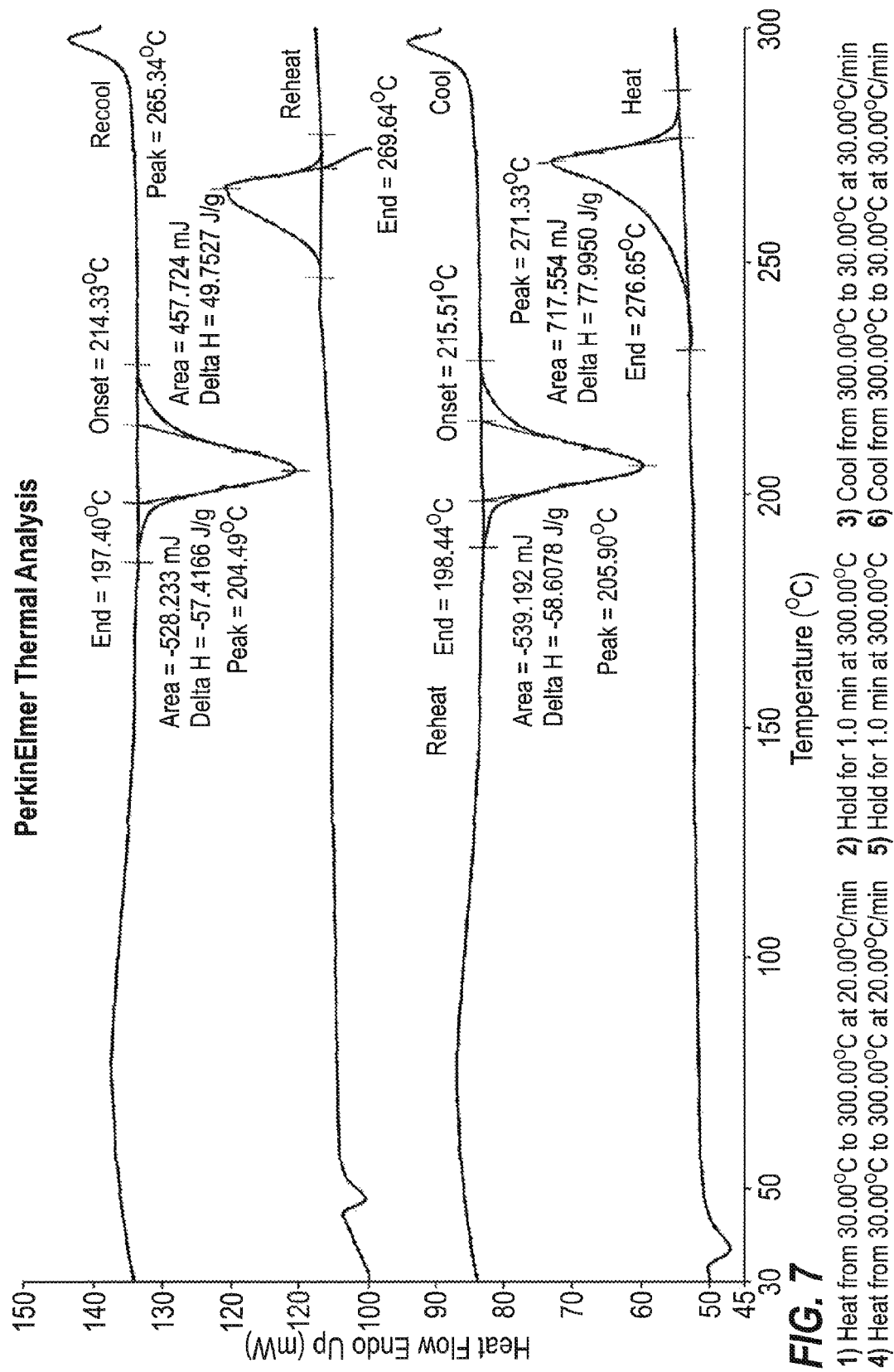
FIG. 7 is a differential scanning calorimetry (DSC) plot of a polyamide used in the present invention.

A DSC trace of batch number 11 is provided in FIG. 6. A DSC trace of batch number 11 after reheat is provided in FIG. 7.
Method 1—Moisture Regain
  A sample (100 g) of each of the polymers obtained in synthesis 1 to 3 was dried for 18 hours at 80° C. under vacuum. The initial moisture level of this dried polymer sample was measured using an Aquatrac (PET version (4 Digit); Brabender Messtechnik) at 160° C. setting on about 1.9 g polymer. A moisture level measured using this method of less than 0.5 w % was taken to indicate that the polymer had been dried sufficiently.

The dried sample was then immersed in demineralised water (500 g) at ambient temperature (20° C.) without any agitation. After 48 hours a sample was removed (approx. 10 g) and patted dry with an absorbent tissue. A portion of the sample (approx. 5 g; weight of wet sample) was weighed accurately into a foil dish and placed in an oven at 80° C. under vacuum for 18 hours. The dish was removed and placed in a desiccator to cool, and then reweighed (weight left after drying). This procedure was repeated at intervals thereafter (e.g. 72, 144, 190 and 220 hours) up to 220 hours. Moisture uptake was determined by the following calculation:

$$\frac{\text{weight of wet sample} - \text{weight left after drying}}{\text{weight of sample after drying}} \times 100 = \% \text{ uptake}$$

The results are summarized in Table 4.

TABLE 4

| Batch Number | Moisture Uptake (after 48 hrs) | Moisture Uptake (after 72 hrs) | Moisture Uptake (after 144 hrs) | Moisture Uptake (after 190 hrs) | Moisture Uptake (after 220 hrs) | Moisture Regain |
|---|---|---|---|---|---|---|
| Control | 2.19 | 2.545 | 1.85 | 2.23 | 2.05 | 2.37 |
| Example 1 | 7.06 | 9.06 | 11.30 | 12.76 | 12.95 | 12.86 |
| Example 2 | 10.6 | 13.39 | 16.99 | 18.20 | 17.90 | 18.05 |
| Example 3 | 16.18 | 19.7 | 23.60 | 23.70 | 24.25 | 23.65 |

Figure 8:
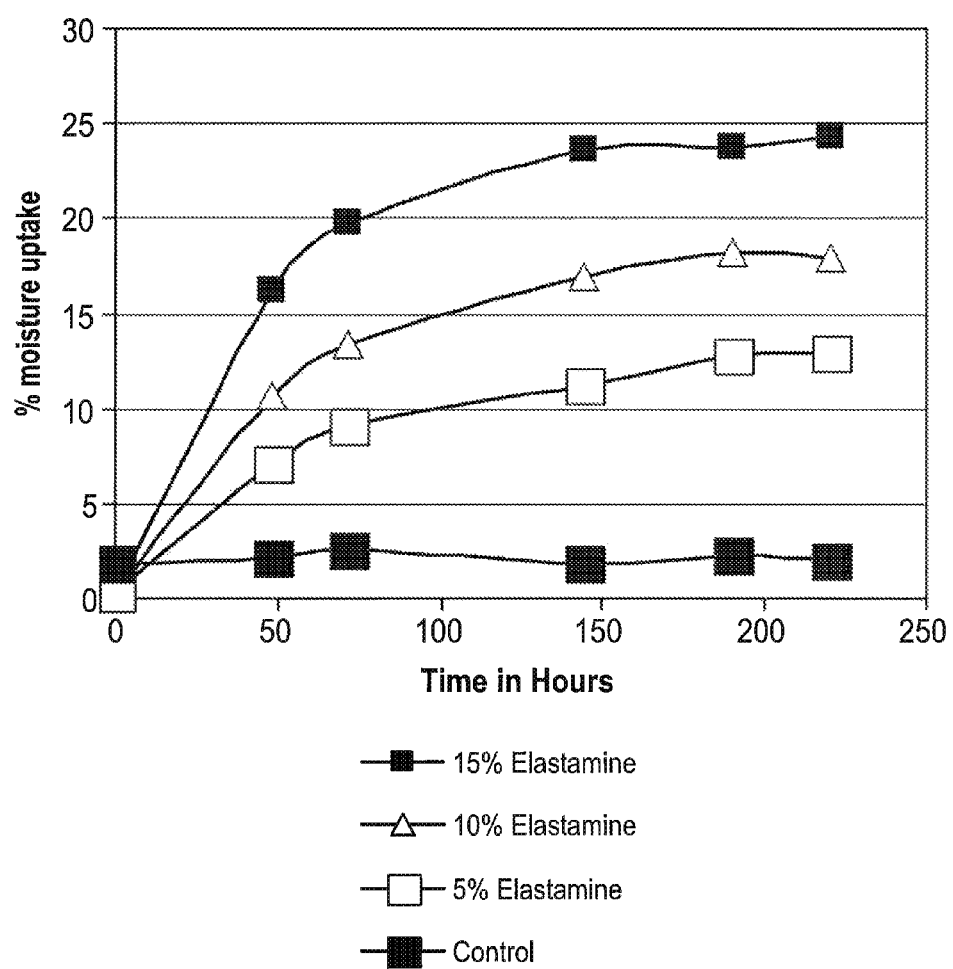
FIG. 8. is a plot showing moisture uptake of polyamides used in the present invention.

A plot showing the results summarized in Table 4 is provided in FIG. 8.

What is claimed is:

1. An apparel textile yarn comprising:
a polyamide, the polyamide comprising a nylon and a polyetherdiamine, the polyetherdiamine having a weight-average molecular weight (Mw) of at least 1500 and an Amine Hydrogen Equivalent Weight (AHEW) of less than 10 percent higher than an idealized AHEW for the polyetherdiamine, wherein a number of active amine hydrogens per molecule, and the AHEW, is calculated by determining an amine group nitrogen content using a procedure described in ISO 9702.

2. An apparel textile yarn according to claim 1, wherein the polyamide has a moisture regain ranging from about 10% to about 30%, and in one embodiment from about 15 to about 25%.

3. An apparel textile yarn of claim 1, wherein the nylon is nylon 6.6.

4. An apparel textile yarn of claim 1, in wherein the nylon is nylon 6.

5. An apparel textile yarn of claim 1, wherein the yarn has an elongation to break of from 20% to 90%.

6. An apparel textile yarn of claim 1, wherein the polyetherdiamine has an AHEW of less than 8 percent higher than the idealized AHEW for the polyetherdiamine.

7. An apparel textile yarn of claim 6, wherein the polyetheramine has an AHEW of less than 5 percent higher than the idealized AHEW for the polyetherdiamine.

8. An apparel textile yarn of claim 6, wherein the polyetherdiamine has an AHEW of less than 2 percent higher than the idealized AHEW for the polyetheramine.

9. An apparel textile yarn of claim 1, wherein the polyetherdiamine has a weight average molecular weight of at least 2500.

10. An apparel textile yarn of claim 9, wherein the polyetherdiamine has a weight average molecular weight of at least 5000.

11. An apparel textile yarn of claim 1, wherein the polyetherdiamine is present in an amount ranging from about 1% to about 20% by weight.

12. An apparel textile yarn of claim 1, wherein the polyamide has 25 to 130 amine end group gram-equivalents per 1000 kilograms of polymer.

13. An apparel textile yarn of claim 12, wherein the polyetherdiamine is present in an amount ranging from about 5 wt % to about 15 wt % by weight, and in one embodiment from about 8 wt % to about 18 wt %, and in a further embodiment from about 10 wt % to about 15 wt %.

14. An apparel textile yarn of claim 1, wherein the polyamide has a relative viscosity ranging from about 25 to about 60, the relative viscosity calculated based on a formic acid test method according to ASTM D789-86.

15. An apparel textile yarn of claim 1, wherein the polyamide has a yellowness index from about 30 to about 45.

16. An apparel textile yarn of claim 1, wherein the polyamide has an L* color coordinate from about 75 to about 85.

17. An apparel textile yarn of claim 1, wherein the polyamide has an a* color coordinate from about −5 to about 5.

18. An apparel textile yarn of claim 1, wherein the polyamide has a b* color coordinate from about 5 to about 25.

19. An apparel textile yarn of claim 1, wherein the polyamide further comprises 0.01 wt % to 1 wt % by weight of an optical brightener.

20. An apparel textile yarn of claim 1, wherein the polyamide further comprises 0.01 to 2 wt % by weight of titanium dioxide.

21. An apparel textile yarn of claim 1, wherein the polyamide further comprises 1 ppm to 500 ppm by weight of an anti-foaming additive.

22. An apparel textile yarn of claim 1, wherein the polyamide further comprises a catalyst.

23. An apparel textile yarn of claim 22, wherein the polyamide further comprises a phosphorus-containing catalyst.

24. An apparel textile yarn of claim 23, wherein the phosphorus-containing catalyst is present ranging from 5 ppm to 1000 ppm phosphorus by weight in the polyamide.

25. An apparel textile yarn of claim 23, wherein the catalyst is selected from the group consisting of phosphoric acid and salts thereof, phosphorous acid and salts thereof, hypophosphoric acid arylphosphonic acids and salts thereof, arylphosphinic acids and salts thereof, sodium hypophosphite, manganese hypophosphite sodium phenylphosphinate, sodium phenylphosphonate, potassium phenylphosphinate, potassium phenylphosphonate, hexamethylenediammonium bis-phenylphosphinate, potassium tolylphosphinate, and mixtures thereof.

26. An apparel textile yarn of claim 22, wherein the catalyst is sodium hypophosphite.

27. An apparel textile yarn of claim 1, wherein the yarn is a multifilament textile yarn.

28. An apparel textile yarn of claim 27, wherein said multifilament textile yarn is in a form of a low orientation yarn (LOY), a partially oriented yarn (POY) or a fully drawn yarn (FDY).

29. An apparel textile yarn of claim 1, wherein the yarn has a yarn weight of 5 to 300 dtex and a filament weight of 0.5 to 7 dtex.

30. An apparel textile yarn of claim 1, wherein the yarn has a filament uniformity in Uster percent of 1.5% or less.

31. An apparel textile yarn of claim 1, wherein the yarn has a tenacity of from 25 to 65 cN/tex.

32. An apparel textile yarn of claim 1, wherein the yarn is a drawn yarn with elongation of 22% to about 60%, a boiling water shrinkage is in a range of 3% to about 10%, a yarn tenacity is a range of 3 to about 7 grams per denier, and a RV of the yarn is within a range of about 40 to about 60.

33. An apparel textile yarn of claim 1, wherein a yarn relative viscosity as measured by a formic acid method is about 51 to about 54.

34. An apparel textile yarn of claim 1, wherein the yarn comprises multi-component filaments or fibers and at least a first portion of said multi-component filaments or fibers are formed by said polyamide and a second portion of said multi-component filaments or fibers is formed by a polymer different from said polyamide.

35. An apparel fabric comprising:
an apparel textile yarn comprising a polyamide, the polyamide comprising a nylon and a polyetherdiamine, the polyetherdiamine having a weight-average molecular weight (Mw) of at least 1500 and an Amine Hydrogen Equivalent Weight (AHEW) of less than 10 percent higher than an idealized AHEW for the polyetherdiamine, wherein a number of active amine hydrogens per molecule, and the AHEW, is calculated by determining an amine group nitrogen content using a procedure described in ISO 9702.

36. An apparel fabric of claim 35, wherein the fabric is a warp knit fabric, a circular knit fabric, a nonwoven fabric or a light denier technical fabric.

37. A garment comprising:
an apparel fabric comprising an apparel textile yarn, said apparel textile yarn comprising a polyamide, the polyamide comprising a nylon and a polyetherdiamine, the polyetherdiamine having a weight-average molecular weight (Mw) of at least 1500 and an Amine Hydrogen Equivalent Weight (AHEW) of less than 10 percent higher than an idealized AHEW for the polyetherdiamine, wherein a number of active amine hydrogens per molecule, and the AHEW, is calculated by determining an amine group nitrogen content using a procedure described in ISO 9702.

38. A garment of claim 37, wherein the garment is a seamless knit garment or hosiery.

39. A process for producing an apparel textile yarn from a polyamide, the process comprising:
extruding a molten polyamide through a spinneret plate containing capillary orifices, and forming an apparel textile yarn from filaments emerging from the spinneret plate, the polyamide comprising a nylon and a polyetherdiamine, the polyetherdiamine having a weight-average molecular weight (Mw) of at least 1500 and an Amine Hydrogen Equivalent Weight (AHEW) of less than 10 percent higher than an idealized AHEW for the polyetherdiamine, wherein a number of active amine hydrogens per molecule, and the AHEW, is calculated by determining an amine group nitrogen content using a procedure described in ISO 9702.

40. A process of claim 39, wherein spinning temperatures range from 270° C. to 300° C.

41. A process of claim 39, wherein a bundle of filaments emerging from the spinneret plate are cooled by conditioned quench air, treated with spin finish and optionally interlaced.

42. A process of claim 39, wherein a polymer is extruded at an extrusion velocity in a range of 20 centimeters per second to 80 centimeters per second.

43. An apparel textile yarn of claim 2, wherein the nylon is nylon 6.6.

44. An apparel textile yarn of claim 2, wherein the nylon is nylon 6.

* * * * *